United States Patent
Chen et al.

(10) Patent No.: US 10,467,456 B2
(45) Date of Patent: Nov. 5, 2019

(54) TRACKING SYSTEM FOR TRACKING AN OBJECT BASED ON SILHOUETTE

(71) Applicant: HTC Corporation, Taoyuan (TW)

(72) Inventors: Yuan-Tung Chen, Taoyuan (TW); Chieh-Yu Tseng, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/952,258

(22) Filed: Apr. 13, 2018

(65) Prior Publication Data
US 2018/0300532 A1 Oct. 18, 2018

Related U.S. Application Data (60) Provisional application No. 62/486,011, filed on Apr. 17, 2017.

(51) Int. Cl.
*H04N 5/225* (2006.01)
*G06K 9/00* (2006.01)
(Continued)

(52) U.S. Cl.
CPC .......... *G06K 9/00208* (2013.01); *G06K 9/20* (2013.01); *G06K 9/4652* (2013.01); *G06T 7/248* (2017.01);
(Continued)

(58) Field of Classification Search
CPC .... G06K 9/00208; G06K 9/20; G06K 9/4652; G06K 2209/40; G06T 7/251; G06T 7/248; G06T 7/74; G06T 2207/30244
See application file for complete search history.

(56) References Cited

U.S. PATENT DOCUMENTS 9,626,568 B2 4/2017 Tang et al.
2008/0080789 A1 4/2008 Marks et al.
(Continued)

FOREIGN PATENT DOCUMENTS

CN 105183148 A 12/2015
CN 205103761 U 3/2016
(Continued)

OTHER PUBLICATIONS

Corresponding Taiwan office action dated Nov. 27, 2018.
(Continued)

*Primary Examiner* — Nam D Pham
(74) *Attorney, Agent, or Firm* — CKC & Partners Co., LLC (57) ABSTRACT

A tracking system includes a trackable device and a tracking device. The trackable device has a three-dimensional shape. The trackable device includes a first orientation sensor for sensing a first orientation of the trackable device. The tracking device is communicated with the trackable device. The tracking device includes a second orientation sensor, an image sensor and a processing circuit. The second orientation sensor is configured to sense a second orientation of the tracking device. The image sensor configured to capture an image. The processing circuit is coupled with the second orientation sensor and the image sensor. The processing circuit is operable to calculate a two-dimensional silhouette corresponding to the three-dimensional shape according to the first orientation and the second orientation, and utilize the two-dimensional silhouette to search the image captured by the image sensor for allocating coordinates of the trackable device within the image.

17 Claims, 11 Drawing Sheets

(51) Int. Cl.
*G06T 7/73* (2017.01)
*G06K 9/20* (2006.01)
*G06K 9/46* (2006.01)
*G06T 7/246* (2017.01)

(52) U.S. Cl.
CPC ............... *G06T 7/251* (2017.01); *G06T 7/74* (2017.01); *G06K 2209/40* (2013.01); *G06T 2207/30244* (2013.01)

(56) References Cited

U.S. PATENT DOCUMENTS

| | | |
|---|---|---|
| 2014/0375680 A1 | 12/2014 | Ackerman et al. |
| 2015/0049201 A1 | 2/2015 | Liu et al. |
| 2015/0139535 A1* | 5/2015 | Siddiqui ............ G06K 9/00208 382/154 |
| 2016/0026253 A1 | 1/2016 | Bradski et al. |

FOREIGN PATENT DOCUMENTS

| | | |
|---|---|---|
| TW | 201126451 A | 8/2011 |
| TW | 201319955 A | 5/2013 |
| TW | 201350178 A | 12/2013 |
| TW | 201350912 A | 12/2013 |
| TW | 201633104 A | 9/2016 |
| TW | 201642943 A | 12/2016 |

OTHER PUBLICATIONS

Adam Riecicky et al., "Optical-inertial Synchronization of MoCap Suit with Single Camera Setup for Reliable Position Tracking", Proceedings of the 13th International Joint Conference on Computer Vision, Imaging and Computer Graphics Theory and Applications, Jan. 28, 2018, pp. 40-47.

Victor Adrian Prisacariu et al., "Real-Time 3D Tracking and Reconstruction on Mobile Phones", IEEE Transactions on Visualization and Computer Graphics, vol. 21, No. 5, May 1, 2015, pp. 557-570.

Gerard Pons-Moll et al., "Multisensor-Fusion for 3D Full-Body Human Motion Capture", 2010 IEEE Conference on Computer Vision and Pattern Recognition (CVPR), Jun. 13-18, 2010, pp. 663-670.

Corresponding European search report dated Sep. 17, 2018.

* cited by examiner

| | OR1a | OR1b | OR1c | OR1d | OR1e |
|---|---|---|---|---|---|
| OR2a | SC1 | SC2 | SC3 | SC4 | SC5 |
| OR2b | SC6 | SC7 | SC8 | SC9 | SC10 |
| OR2c | SC11 | SC12 | SC13 | SC14 | SC15 |

LUT1

TRACKING SYSTEM FOR TRACKING AN OBJECT BASED ON SILHOUETTE

CROSS-REFERENCE TO RELATED APPLICATION

This application claims priority to U.S. Provisional Application Ser. No. 62/486,011, filed on Apr. 17, 2017, which is herein incorporated by reference.

BACKGROUND

Field of Invention

The disclosure relates to a tracking system. More particularly, the disclosure relates to a manner about tracking an object according to a silhouette of the object.

Description of Related Art

Recently, applications for virtual reality (VR) experiences are well developed. Various solutions, including high-end systems (e.g., HTC VIVE, Oculus Rift) to low-cost systems (e.g., google cardboard), are introduced to provide VR experiences to users.

One important feature of the virtual reality experiences is that the user can move freely in virtual scene and visions seen by the user will vary accordingly. To achieve aforesaid feature, the virtual reality system requires a tracking manner to monitor a movement of the user. On the high-end systems, there are many solutions to detect the movement precisely. However, on the low-cost systems, it is hard to sense the movement of the user.

SUMMARY

The disclosure provides a tracking system, which includes a trackable device and a tracking device. The trackable device has a three-dimensional shape. The trackable device includes a first orientation sensor for sensing a first orientation of the trackable device. The tracking device is communicated with the trackable device. The tracking device includes a second orientation sensor, an image sensor and a processing circuit. The second orientation sensor is configured to sense a second orientation of the tracking device. The image sensor configured to capture an image. The processing circuit is coupled with the second orientation sensor and the image sensor. The processing circuit is operable to calculate a two-dimensional silhouette corresponding to the three-dimensional shape according to the first orientation and the second orientation, and utilize the two-dimensional silhouette to search the image captured by the image sensor for allocating coordinates of the trackable device within the image.

The disclosure further provides a tracking method suitable between a tracking device and a trackable device having a three-dimensional shape. The tracking method include following operations. A first orientation of the trackable device is sensed by a first orientation sensor of the trackable device. The first orientation is transmitted from the trackable device to the tracking device. A second orientation of the tracking device is sensed by a second orientation sensor of the tracking device. A two-dimensional silhouette corresponding to the three-dimensional shape of the trackable device is calculated according to the first orientation of the trackable device and the second orientation of the trackable device. An image is captured by an image sensor of the tracking device. The two-dimensional silhouette is utilized to search the image captured by the image sensor for allocating coordinates of the trackable device within the image.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 4A to FIG. 4D are schematic diagrams illustrating different embodiments of the two-dimensional silhouettes calculated according different combinations of the first orientations and the second orientations.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
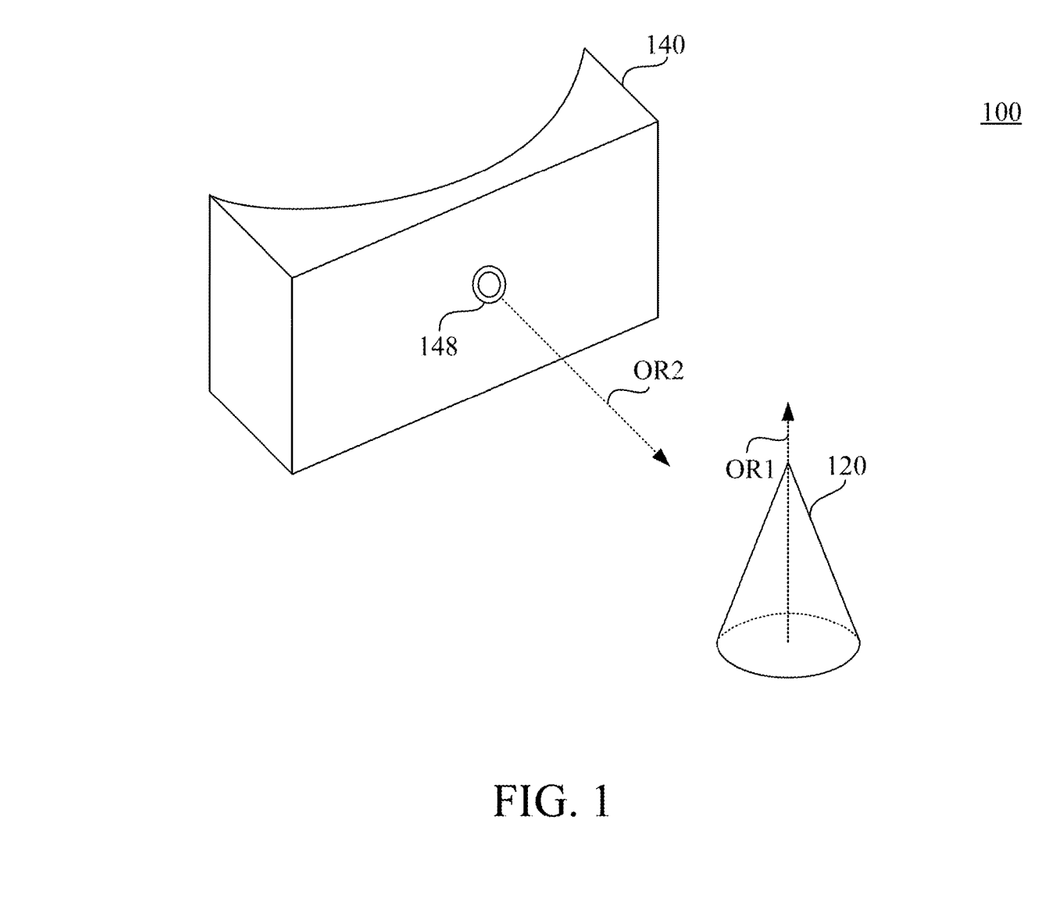
FIG. 1 is a schematic diagram illustrating a tracking system according to an embodiment of the disclosure.

Reference is made to FIG. 1, which is a schematic diagram illustrating a tracking system 100 according to an embodiment of the disclosure. As shown in FIG. 1, the tracking system 100 includes a trackable device 120 and a tracking device 140. As an embodiment shown in FIG. 1, the tracking device 140 includes an image sensor 148.

The image sensor 148 is configured to capture an image (or capture a series of images sequentially over time). In some embodiment, the image sensor 148 can be a visible optical camera, an infrared camera or any equivalent optical sensor. The tracking device 140 is able to track a position of the trackable device 120 relative to the tracking device 140 by analyzing data in the image captured by the image sensor 148. In an embodiment, the tracking device 140 may apply a two-dimensional mask (corresponding to a shape of the trackable device 120) onto the image captured by the image sensor 148, so as to search for the trackable device 120 within the image in reference with the two-dimensional mask.

In some cases, if the tracking device 140 applies one identical two-dimensional mask to search for the trackable device 120 under all different conditions, some errors may occur in searching process. For example, the trackable device 120 (or the tracking device 140) may be rotated or tilted to one direction, and the trackable device 120 will appear in a different shape in view of the image sensor 148 of the tracking device 140. Therefore, applying a uniform-shaped two-dimensional mask on the tracking device 140 in searching for the trackable device 120 within the captured image may cause some problems, such as reducing preciseness of tracking. In some embodiments, the tracking system 100 is able to dynamically calculate a two-dimensional silhouette (which is not fixed in an identical shape) corresponding to the three-dimensional shape of the trackable device 120. Details about how to calculate the two-dimensional silhouette will be explained in following paragraphs.

In the embodiment shown in FIG. 1, a three-dimensional shape of the trackable device 120 is a cone shape. However, the cone shape of the trackable device 120 is simply an example for demonstration. The three-dimensional shape of the trackable device 120 is not limited to a specific shape. In some other embodiments of the disclosure, the three-dimensional shape can also be a cube shape, an ellipsoid shape, a polyhedron shape or an irregular shape (e.g., a rock shape, a rifle shape, a shotgun shape, a baseball bat shape, a glove shape). For brevity of explanations, the cone-shaped trackable device 120 is utilized in following the paragraphs for demonstration.

In an embodiment, the tracking device 140 can be a host device of the tracking system 100, and the trackable device 120 can be a client device to be tracked by the tracking device 140. For example, the tracking device 140 can be a head-mounted display (HMD) device of a virtual reality (VR), augmented reality (AR), substitutional reality (SR) or mixed reality (MR) system, and the trackable device 120 can be a controller of the system (or a partial portion of the controller). However, the disclosure is not limited to be used between the head-mounted display device and the controller.

Figure 2:
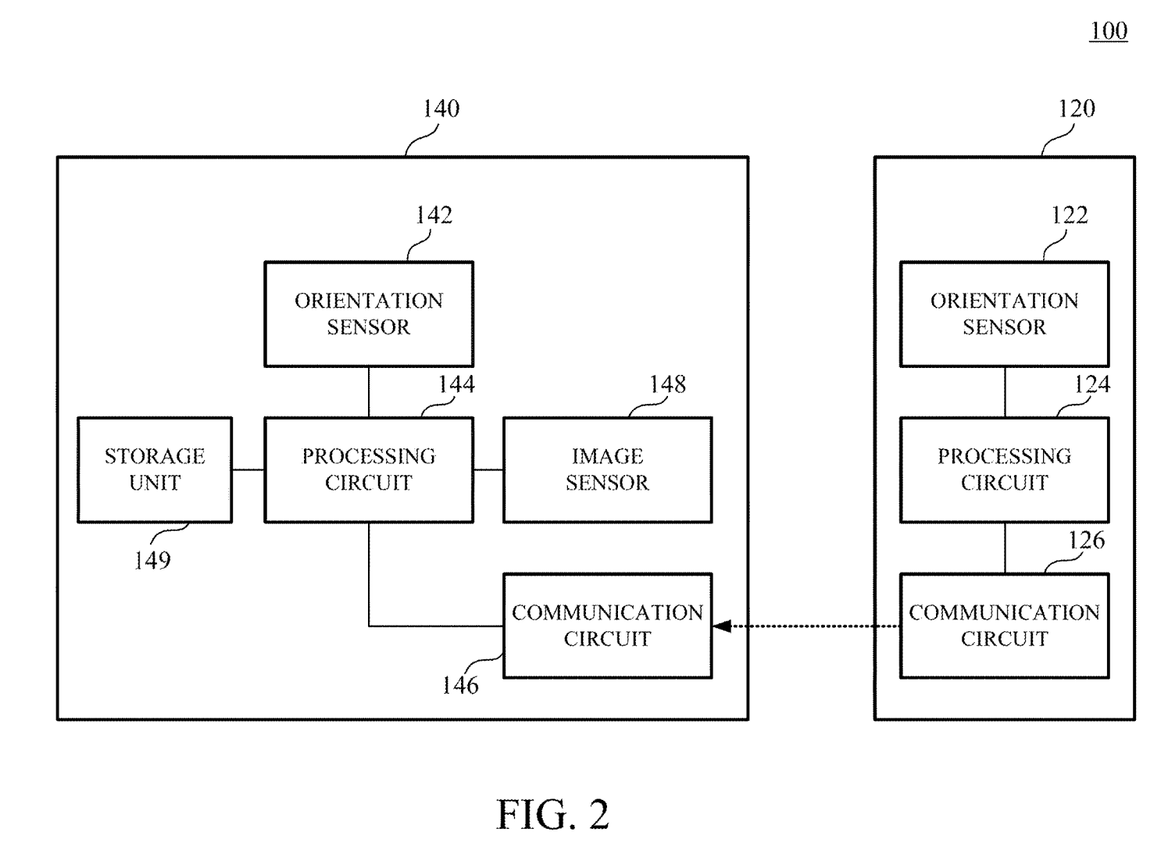
FIG. 2 is a functional block diagram illustrating the tracking system shown in FIG. 1.

Reference is further made to FIG. 2. FIG. 2 is a functional block diagram illustrating the tracking system 100 shown in FIG. 1. As shown in FIG. 2, the trackable device 120 includes an orientation sensor 122, a processing circuit 124 and a communication circuit 126. The processing circuit 124 is coupled with the orientation sensor 122 and the communication circuit 126.

In some embodiments, the orientation sensor 122 can be implemented by an Inertial Measurement Unit (IMU). The Inertial Measurement Unit is able to sense accelerations and angular rates on the trackable device 120 along multiple axes. However, the disclosure is not limited thereto. The orientation sensor 122 can also be implemented by an accelerometer or a gyro sensor, or any equivalent orientation sensor.

In an embodiment, the orientation sensor 122 may directly sense a first orientation OR1 of the trackable device 120. In another embodiment, the orientation sensor is configured to sense relative data (e.g., accelerations, angular rates, a gravity direction) about the first orientation OR1, and the relative data is calculated by the processing circuit 124 to determine the first orientation OR1. In the embodiment shown in FIG. 1, the first orientation OR1 represent a directional vector extending along a central axis of the trackable device 120.

The communication circuit 126 is configured to transmit the first orientation OR1 sensed by the orientation sensor 122 to the tracking device 140. The communication circuit 126 can be implemented by a radio frequency transceiver circuit, a local-area communication circuit and/or a telecommunication circuit. The radio frequency transceiver circuit can include an antenna for transmitting or receiving a radio frequency signal. The local-area communication circuit can include a Bluetooth Low-Energy (BLE) transceiver, a Near Field Communication (NFC) transceiver, a WiFi-direct transceiver, a Zigbee transceiver and any equivalent transceiver. The telecommunication circuit can include 2G, 3G, 4G and/or 5G telecommunication transceiver. The processing circuit 124 can be implemented by a processor, a central processing unit, a graphic processing unit or an Application-specific integrated circuit (ASIC).

As shown in FIG. 2, the tracking device 140 includes an orientation sensor 142, a processing circuit 144, a communication circuit 146 and the image sensor 148. The processing circuit 144 is coupled with the orientation sensor 142, the communication circuit 146 and the image sensor 148.

In some embodiments, the orientation sensor 142 can be implemented by an Inertial Measurement Unit (IMU). The Inertial Measurement Unit is able to sense accelerations and angular rates on the tracking device 140 along multiple axes. However, the disclosure is not limited thereto. The orientation sensor 142 can also be implemented by an accelerometer or a gyro sensor, or any equivalent orientation sensor.

In an embodiment, the orientation sensor 142 may directly sense a second orientation OR2 of the tracking device 140. In another embodiment, the orientation sensor is configured to sense relative data (e.g., accelerations, angular rates, a gravity direction) about the second orientation OR2, and the relative data is calculated by the processing circuit 144 to determine the second orientation OR2. In the embodiment shown in FIG. 1, the second orientation OR2 represent a directional vector extending along a central axis of the tracking device 140 (or extending along a central axis of the image sensor 148) as shown in FIG. 1.

The communication circuit 146 is configured to receive the first orientation OR1 from the trackable device 120. The communication circuit 146 can be implemented by a radio frequency transceiver circuit, a local-area communication circuit and/or a telecommunication circuit.

The processing circuit 144 can be implemented by a processor, a central processing unit, a graphic processing unit or an Application-specific integrated circuit (ASIC). The processing circuit 144 is configured to calculate a two-dimensional silhouette corresponding to the three-dimensional shape of the trackable device according to the first orientation and the second orientation.

Figure 3:
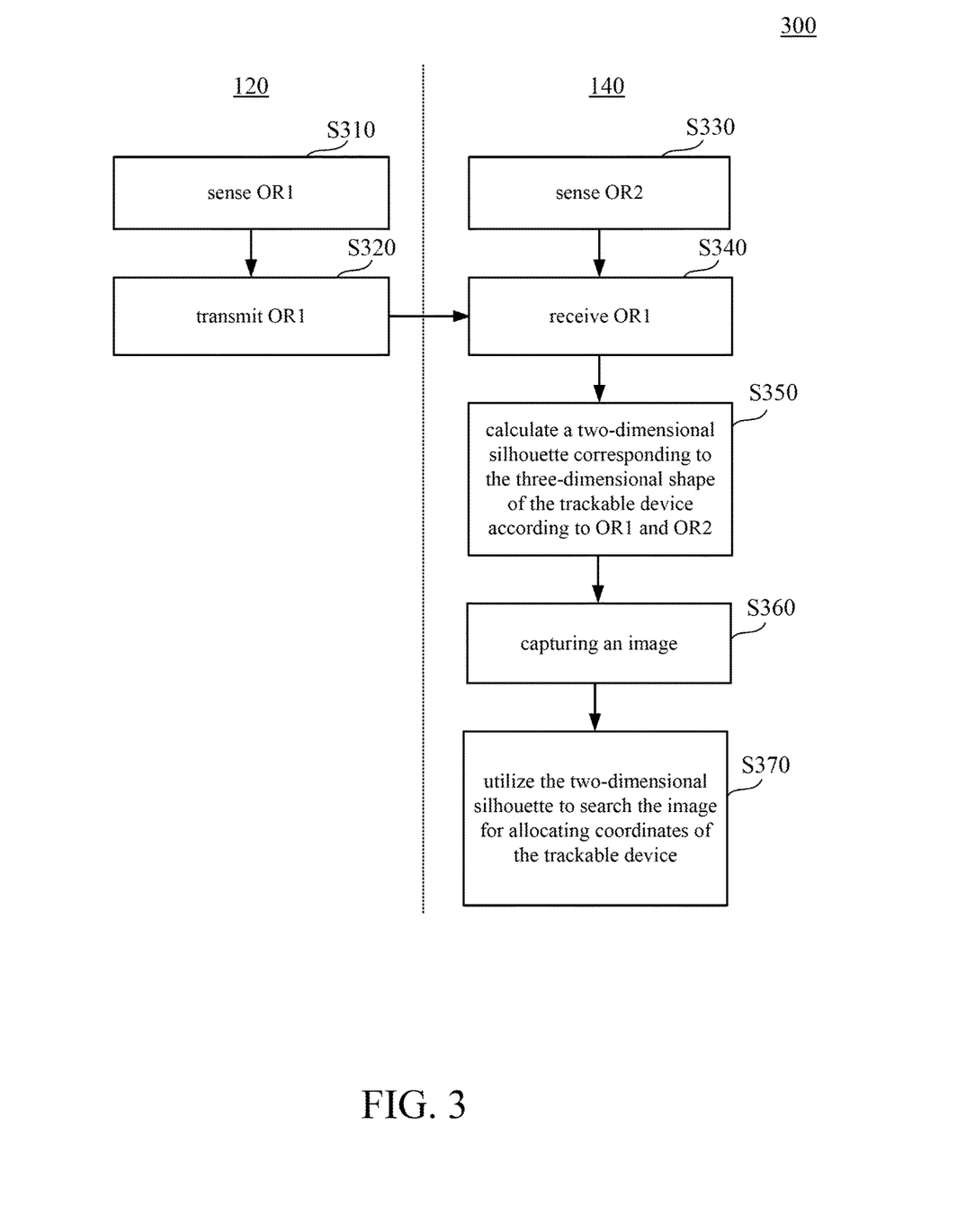
FIG. 3 is a flow chart diagram illustrating a tracking method according to some embodiments of the disclosure.

Reference is further made to FIG. 3, which is a flow chart diagram illustrating a tracking method 300 according to some embodiments of the disclosure. The tracking method 300 is suitable to be used between the trackable device 120 and the tracking device 140 in the tracking system 100 shown in FIG. 1 and FIG. 2.

As shown in FIG. 2 and FIG. 3, operation S310 is executed by the orientation sensor 122 on the trackable device 120 to sense the first orientation OR1. Operation S320 is executed by the communication circuit 126 to transmit the first orientation OR1 from the trackable device 120 to the tracking device 140.

On the tracking device 140, operation S330 is executed by the orientation sensor 142 on the tracking device 140 to sense the second orientation OR2. Operation S340 is executed by the communication circuit 146 to receive the first orientation OR1 from the trackable device 120. Operation S350 is executed by the processing circuit 144 to calculate a two-dimensional silhouette corresponding to the three-dimensional shape of the trackable device according to the first orientation OR1 and the second orientation OR2.

Reference are further made to FIG. 4A, FIG. 4B, FIG. 4C and FIG. 4D. FIG. 4A to FIG. 4D are schematic diagrams illustrating different examples of the two-dimensional silhouettes calculated according different combinations of the first orientation OR1 and the second orientation OR2.

In a case that the image sensor 148 is facing toward the trackable device 120 and also that the trackable device 120 and the tracking device 140 are on similar horizontal level, the first orientation OR1 may be perpendicular to the second orientation OR2. In the situation that the first orientation OR1 is perpendicular to the second orientation OR2, the two-dimensional silhouette calculated by the processing circuit 144 will be the two-dimensional silhouette SILH1 shown in FIG. 4A in a triangle shape, because the image sensor 148 is facing a front surface of the trackable device 120 in the cone shape.

In a case that the image sensor 148 faces toward the trackable device 120 from a lower angle (i.e., the tracking device 140 is located at a lower position relative to the trackable device 120), the first orientation OR1 and the second orientation OR2 may form an acute angle (less than 90 degrees) along one axis. In the situation that the first orientation OR1 and the second orientation OR2 form an acute angle, the two-dimensional silhouette calculated by the processing circuit 144 will be the two-dimensional silhouette SILH2 shown in FIG. 4B in a fan shape (or a sector shape), because the image sensor 148 is facing the trackable device 120 in the cone shape from a lower angle.

In a case that the image sensor 148 faces toward the trackable device 120 from a bottom side of the trackable device 120, the first orientation OR1 and the second orientation OR2 may overlap or almost parallel with each other. In the situation that first orientation OR1 and the second orientation OR2 overlap or almost parallel with each other, the two-dimensional silhouette calculated by the processing circuit 144 will be the two-dimensional silhouette SILH3 shown in FIG. 4C in a round shape, because the image sensor 148 is facing a bottom side of the trackable device 120 in the cone shape.

Figure 4A:
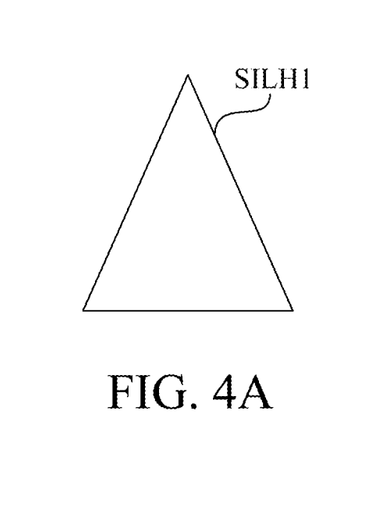
Figure 4B:
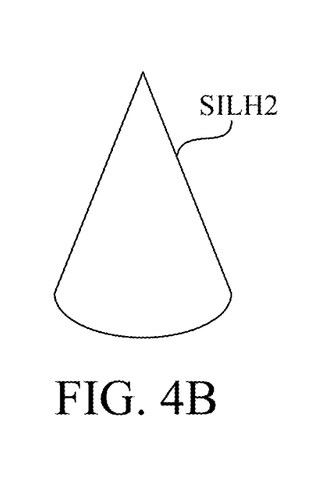
Figure 4C:
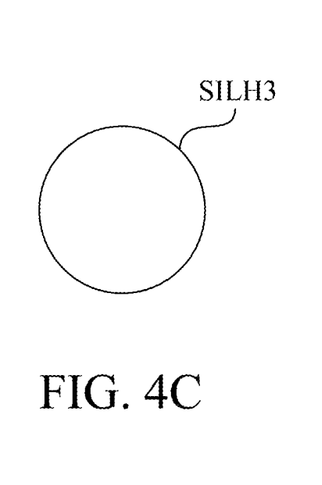
Figure 4D:
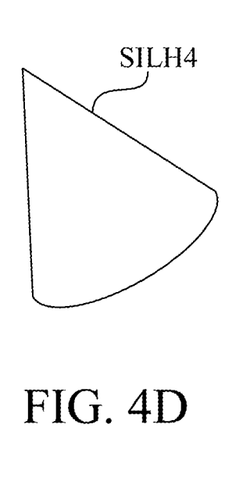

In a case that the image sensor 148 faces toward a front side of the trackable device 120 from a lower angle and also that the trackable device 120 is rotated or tilted to the left side relative to the tracking device 140, the first orientation OR1 and the second orientation OR2 may form another acute angle along one axis (different from the axis in aforesaid embodiment of FIG. 4B). In the situation that the first orientation OR1 and the second orientation OR2 form another acute angle, the two-dimensional silhouette calculated by the processing circuit 144 will be the two-dimensional silhouette SILH4 shown in FIG. 4D in a fan shape (or a sector shape) tilting to the left side, because the image sensor 148 is facing the tilted trackable device 120 in the cone shape from a lower angle.

FIG. 4A to FIG. 4D provides some examples about different two-dimensional silhouettes SILH1-SILH4 calculated under the different combinations of the first orientation OR1 and the second orientation OR2. However, the two-dimensional silhouettes calculated by the processing circuit 144 are not limited to these four examples. Based on similar manners, the two-dimensional silhouette calculated by the processing circuit 144 can be rotated to the ride side, or even flipped to the bottom side.

Figure 5:
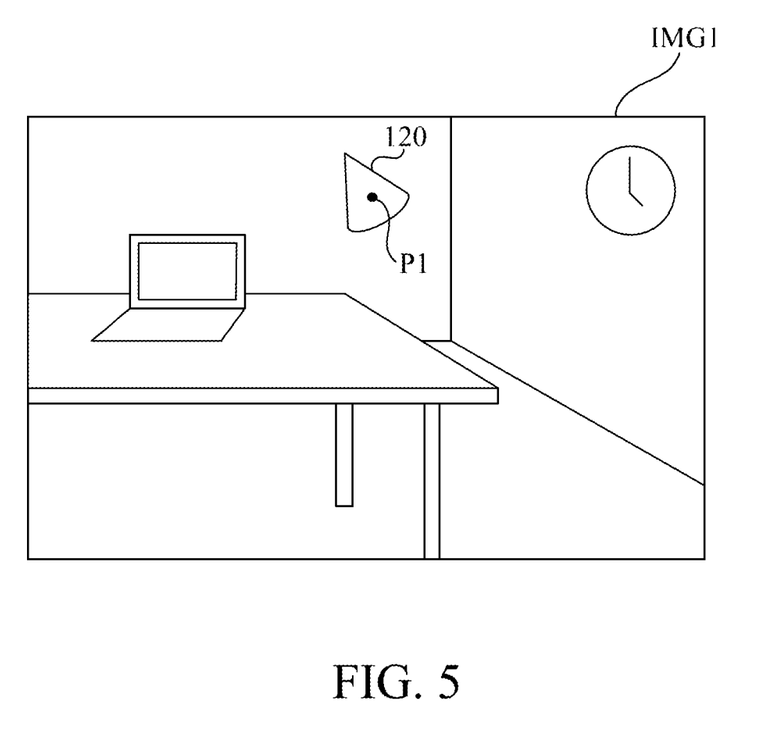
FIG. 5 is a schematic diagram illustrating the image captured by the image sensor according to an embodiment of the disclosure.

It is assumed that the two-dimensional silhouette SILH4 is calculated by the processing circuit 144 according to the first orientation OR1 and the second orientation OR2. Operation S360 is executed by the image sensor 148 of the tracking device 140 to capture image. Reference is further made to FIG. 5, which is a schematic diagram illustrating the image IMG1 captured by the image sensor 148 according to an embodiment of the disclosure. As shown in FIG. 5, the trackable device 120 appears in the image IMG1 captured by the image sensor 148. In order to track a position of the trackable device 120, the processing circuit 144 must extract or identify the trackable device 120 from a background and other objects in the image IMG1. In this embodiment, operation S370 is executed by the processing circuit 144 to utilize the two-dimensional silhouette SILH4 (shown in FIG. 4D) to search the image IMG1 captured by the image sensor 148, so as to allocate coordinates P1 of the trackable device 120 within the image IMG1. In this case, the two-dimensional silhouette SILH4 calculated according to the first orientation OR1 and the second orientation OR2 will be suitable to extract the trackable device 120 from the background and other object in the image IMG1. Therefore, a preciseness of the tracking device 140 in tracking the trackable device 120 will be elevated by adopting a suitable searching mask (i.e., the two-dimensional silhouette SILH4).

Figure 6:
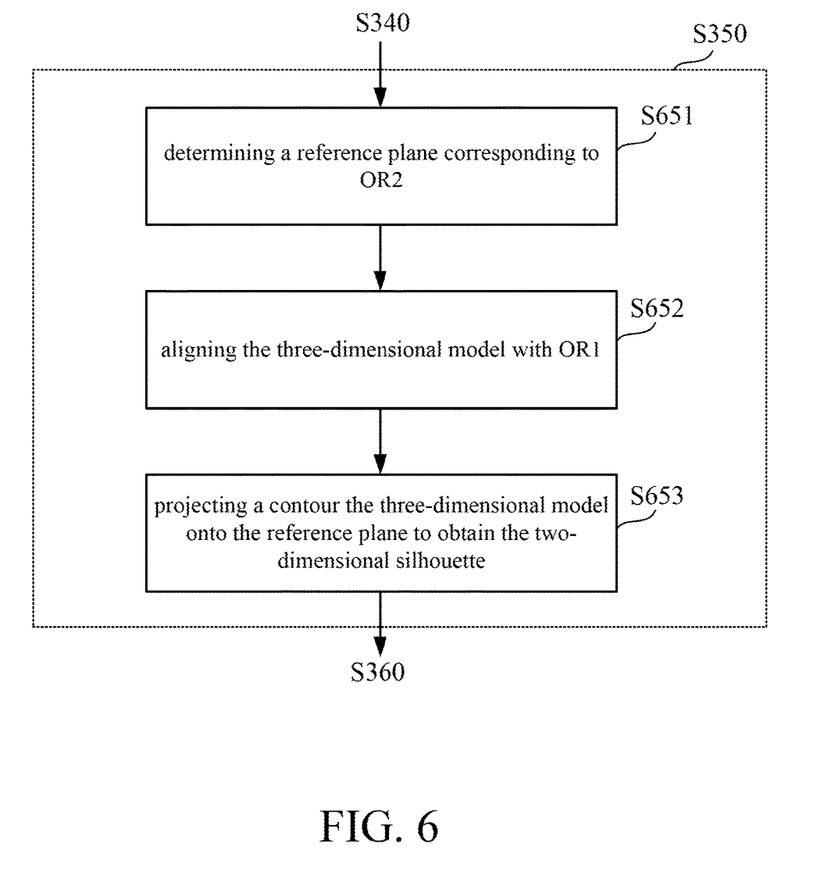
FIG. 6 is a flow chart diagram illustrating further detail operations of one operation in FIG. 3 according to an embodiment of the disclosure.
Figure 7:
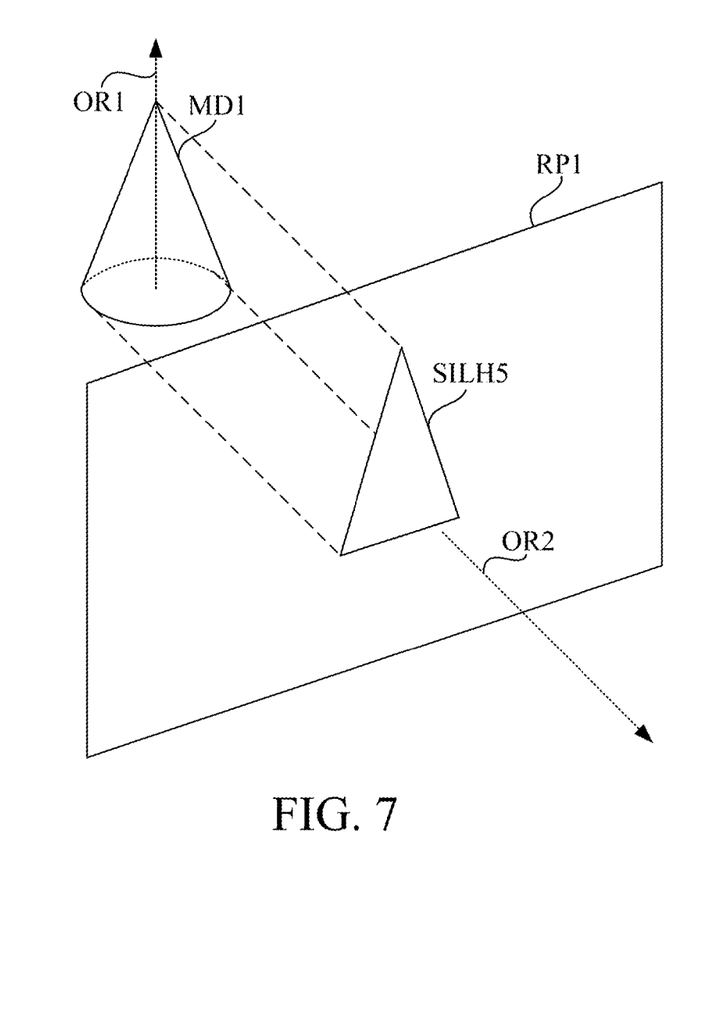
FIG. 7 is a schematic diagram illustrating a two-dimensional silhouette calculated by the detail operations shown in FIG. 6.

Reference is further made to FIG. 6 and FIG. 7. FIG. 6 is a flow chart diagram illustrating further detail operations of the operation S350 in FIG. 3 according to an embodiment of the disclosure. FIG. 7 is a schematic diagram illustrating a two-dimensional silhouette calculated by the detail operations shown in FIG. 6. As shown in FIG. 2, the tracking device 140 in an embodiment may further include a storage unit 149. The storage unit 149 is coupled with the processing circuit 144. In this embodiment shown in FIG. 2, FIG. 6 and FIG. 7, the storage unit 149 is configured to store a three-dimensional model MD1 matching with the three-dimensional shape of the trackable device 120. Operation S651 is executed to determine a reference plane RP1 (referring to FIG. 7) according to the second orientation OR2. In this embodiment as shown in FIG. 7, a normal vector of the reference plane RP1 can be determined by the second orientation OR2. Operation S652 is executed to align the three-dimensional model MD1 with the first orientation OR1. In this embodiment as shown in FIG. 7, a central axis of the three-dimensional model MD1 can be aligned to the first orientation OR1. Operation S653 is executed to project a contour the three-dimensional model MD1 onto the reference plane RP1 to obtain the two-dimensional silhouette SILH5. In the embodiment shown in FIG. 6 and FIG. 7, the two-dimensional silhouette SILH5 is dynamically calculated according the three-dimensional model MD1, the first orientation OR1 and the second orientation OR2.

Figure 8:
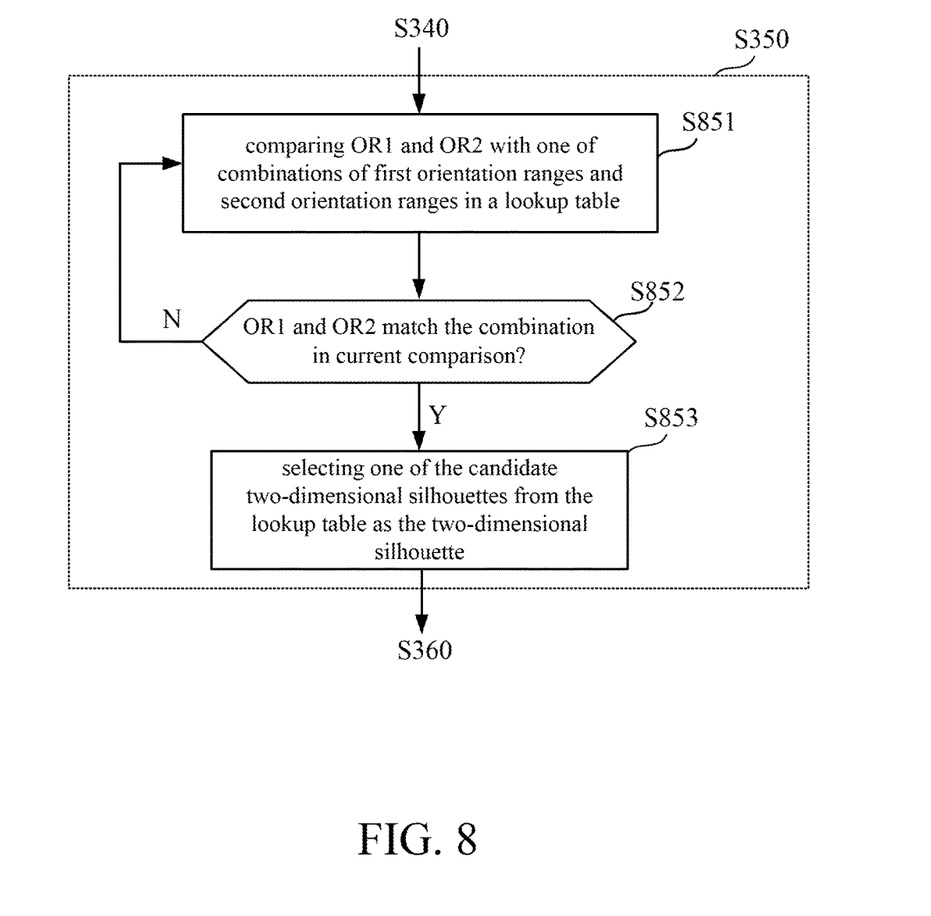
FIG. 8 is a flow chart diagram illustrating further detail operations of one operation in FIG. 3 according to another embodiment of the disclosure.

Reference is further made to FIG. 8, which is a flow chart diagram illustrating further detail operations S851-S853 of the operation S350 in FIG. 3 according to another embodiment of the disclosure.

Figure 9:
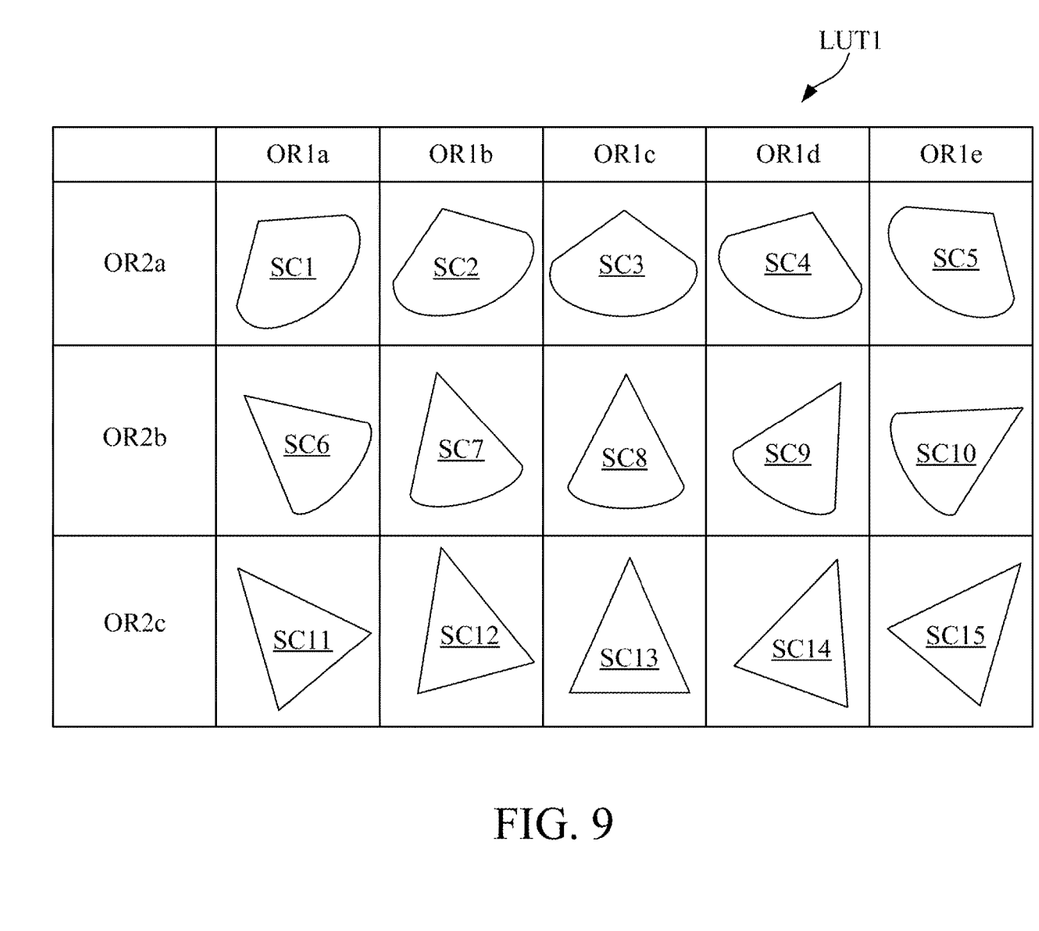
FIG. 9 is a schematic diagram illustrating an embodiment of a lookup table corresponding to an embodiment shown in FIG. 8.

In some embodiments, the tracking device 140 as shown in FIG. 2 further includes a storage unit 149. The storage unit 149 is coupled with the processing circuit 144. The storage unit 149 can be implemented by a memory, a flash memory, a hard-disk, a transitory computer-readable medium and/or a non-transitory computer-readable medium. The storage unit 149 is configured to store a lookup table. Reference is further made to FIG. 9, which is a schematic diagram illustrating an example of a lookup table LUT1 corresponding to an embodiment shown in FIG. 8.

The lookup table LUT1 stored in the storage unit 149 is configured to record multiple candidate two-dimensional silhouettes, such as the candidate two-dimensional silhouettes SC1-SC15 shown in FIG. 9. The candidate two-dimensional silhouettes SC1-SC15 correspond to different first orientation ranges OR1a-OR1e of the first orientation OR1 on the trackable device 120 and different second orientation ranges OR2a-OR2i c of the second orientation OR2 on the tracking device 140. For example, the candidate two-dimensional silhouette SC1 corresponds to the first orientation range OR1a and the second orientation range OR2a; the candidate two-dimensional silhouette SC2 corresponds to the first orientation range OR1b and the second orientation range OR2a; and the candidate two-dimensional silhouette SC3 corresponds to the first orientation range OR1c and the second orientation range OR2a.

For the candidate two-dimensional silhouettes SC1-SC5, the second orientation range OR2a remains the same and the first orientation OR1 of the trackable device 120 is rotated from tilting to the left (corresponding to the first orientation range OR1a) to tilting to the right (corresponding to the first orientation range OR1e). For the candidate two-dimensional silhouettes SC3, SC8 and SC13, the first orientation range OR1c remains the same and the second orientation OR2 of the tracking device 140 is moved from a lower level than the trackable device 120 (corresponding to the second orientation range OR2a) to a similar level with the trackable device 120 (corresponding to the second orientation range OR2c). The lookup table LUT1 can be established in advance by placing the trackable device 120 in front of the tracking device 140, capturing reference images of the trackable device 120, recording the corresponding candidate two-dimensional silhouettes SC1-SC15 in the reference images under the different first orientation ranges OR1a-OR1e and different second orientation ranges OR2a-OR2c into the lookup table LUT1. The lookup table LUT1 can be established in advance and stored in the storage unit 149. In this example, there are five first orientation ranges OR1a-OR1e and three second orientation ranges OR2a-OR2c are illustrated in the lookup table LUT1 for demonstration. However, the lookup table LUT1 may include more combinations of first orientation ranges and second orientation ranges to cover different variations of spatial positions. The lookup table LUT1 is not limited to the example shown in FIG. 9.

In some embodiments, the operation S350 in FIG. 3 can be performed by executing operations S851 to S853 in the embodiment shown in FIG. 8. Referring to FIG. 2, FIG. 3, FIG. 8 and FIG. 9, after the first orientation OR1 of the trackable device 120 and the second orientation OR2 on the tracking device 140 are detected, operation S851 is executed to compare the first orientation OR1 sensed by the tracking object 120 and the second orientation OR2 sensed by the tracking device 140 with one combination (e.g., a combination of OR1a and OR2a) selected from the first orientation ranges OR1a-OR1e and the second orientation ranges OR2a-OR2c in the lookup table LUT1.

In an example, operation S852 is executed to determine whether the first orientation OR1 sensed by the tracking object 120 and the second orientation OR2 sensed by the tracking device 140 matches the combination in current comparison. If the comparison fails to match (OR1 and OR2 does not fall into the combination of OR1a and OR2a), the operation S851 will be executed again to compare the first orientation OR1 and the second orientation OR2 with another combination (e.g., a combination of OR1b and OR2a) selected from the first orientation ranges OR1a-OR1e and the second orientation ranges OR2a-OR2c in the lookup table LUT1. If the comparison finds a match (OR1 and OR2 fall into the combination of OR1b and OR2a), operation S853 will be executed to select one of the candidate two-dimensional silhouettes SC1-SC15 from the lookup table LUT1 as the two-dimensional silhouette (e.g., the candidate two-dimensional silhouettes SC2 will be selected in this example).

Based on the operations S851 to S853 in the embodiment shown in FIG. 8, the two-dimensional silhouette will be selected from the lookup table LUT1 established in advance, such that the tracking device 140 can rapidly determine the suitable mask (the two-dimensional silhouette) for tracking the trackable device 120 appeared in the images captured by the image sensor 148.

Figure 10:
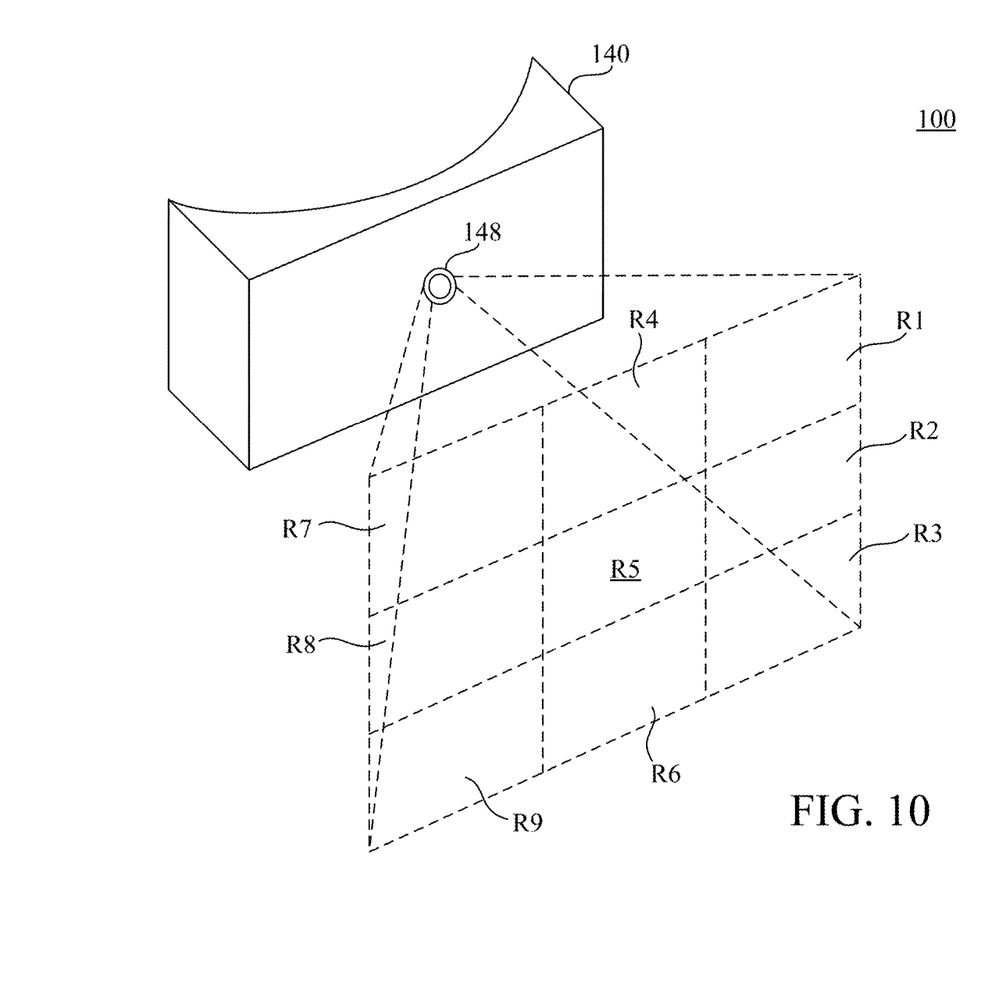
FIG. 10 is a schematic diagram illustrating a field of view of the image sensor of the tracking device in FIG. 1.

Reference is further made to FIG. 10, which is a schematic diagram illustrating a field of view of the image sensor 148 of the tracking device 140 in FIG. 1. As shown in FIG. 10, the field of view of the image sensor 148 covers different regions R1-R9 as shown in FIG. 10. The trackable device 120 located in different regions relative to the tracking device 140 will not appear in the same contour. For example, when the trackable device 120 located in the region R4 relative to the image sensor 148 will show relatively more of the bottom side of the trackable device 120; and, when the trackable device 120 located in the region R6 relative to the image sensor 148 will show relatively more of the top side of the trackable device 120. In this case, it will not be ideal for the tracking device 140 to utilize the same mask (e.g., the two-dimensional silhouette) to search the trackable device 120 in all regions R1-R9 of the image captured by the image sensor 148.

Figure 11:
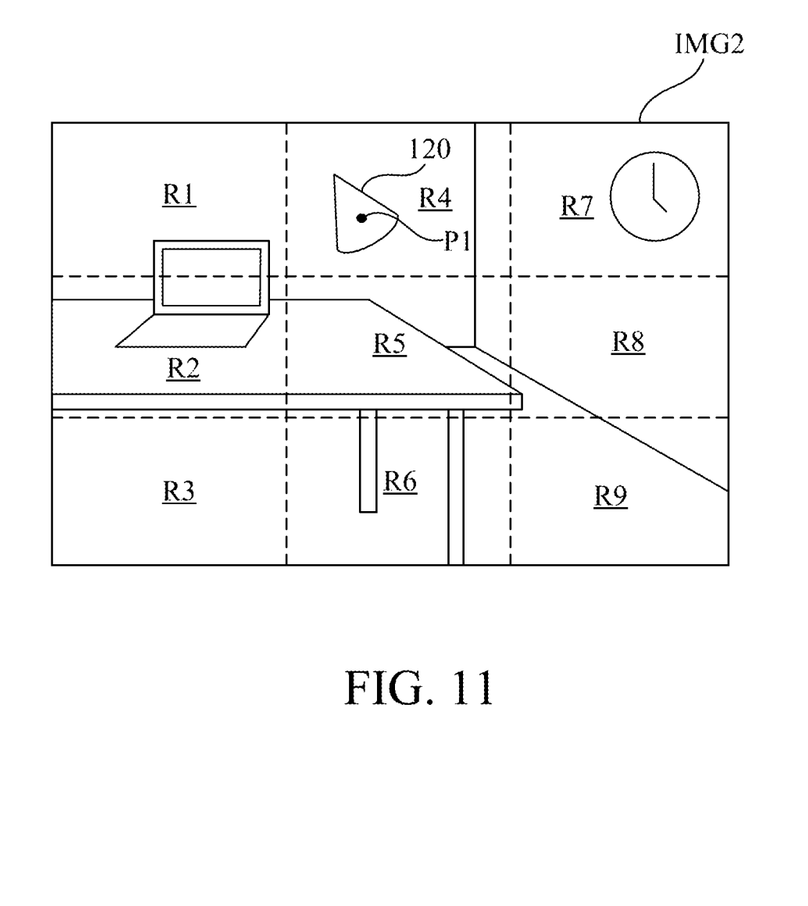
FIG. 11 is a schematic diagram illustrating an embodiment of an image captured by the image sensor.

Reference is further made to FIG. 11, which is a schematic diagram illustrating an embodiment of an image IMG2 captured by the image sensor 148. In some embodiments, the storage unit 149 is configured to store K different versions of lookup tables. Each one of the K lookup tables records candidate two-dimensional silhouettes. Each one of the K lookup tables is in the same structure of the lookup table LUT1 shown in FIG. 9. However, the K lookup tables view the trackable device 120 from different point of views. Therefore, the candidate two-dimensional silhouettes in one of the K lookup tables will be different from another one of the K lookup tables. K is a positive integer. In the embodiments shown in FIG. 10 and FIG. 11, K is equal to 9. However, the disclosure is not limited thereto.

These K lookup tables can be established separately in advance and stored in the storage unit 149. Details about how to establish the K lookup tables are similar to the establishing process of the lookup table LUT1 by placing the trackable device 120 at different regions R1-R9 in front of the tracking device 140, capturing reference images of the trackable device 120, recording the corresponding candidate two-dimensional silhouettes in the reference images under the different first orientation ranges and different second orientation ranges into the K lookup tables.

The processing circuit 144 is operate to calculate K two-dimensional silhouettes in reference with the K lookup tables corresponding to the three-dimensional shape of the trackable device 120 according to the first orientation OR1 and the second orientation OR2. The processing circuit 144 is further operate to divide the image IMG2 captured by the image sensor into K divided regions R1-R9.

The processing circuit 144 is further operate to utilize one of the K two-dimensional silhouettes to search within a corresponding one of the K divided regions R1-R9 for allocating coordinates P1 of the trackable device 120 within the image IMG2. In this case, the processing circuit 144 will utilizes nine different two-dimensional silhouettes to search the nine divided regions R1-R9 in the image IMG2. Each of the nine different two-dimensional silhouettes utilized by the processing circuit 144 is decided separately according to the first orientation OR1 and the second orientation OR2 in correspondence with one divided region.

Based on the embodiments shown in FIG. 10 and FIG. 11, the two-dimensional silhouette will be selected from the different lookup tables established in advance, such that the tracking device 140 can rapidly determine the suitable mask (the two-dimensional silhouette) for tracking the trackable device 120 appeared in the different divided regions of the images captured by the image sensor 148. Preciseness for tracking the trackable device 120 based on images captured by the image sensor 148 of the tracking device 140 will be elevated and also computation time for tracking will be reduced because the processing circuit 144 is able search the regions of the image IMG2 with a proper mask (the selected two-dimensional silhouette).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking system, comprising:
    a trackable device having a three-dimensional shape, the trackable device comprising a first orientation sensor configured to sense a first orientation of the trackable device; and
    a tracking device communicated with the trackable device, the tracking device comprising:
        a second orientation sensor configured to sense a second orientation of the tracking device;
        an image sensor configured to capture an image; and
        a processing circuit coupled with the second orientation sensor and the image sensor, the processing circuit is operable to:
            calculate a two-dimensional silhouette corresponding to the three-dimensional shape of the trackable device according to the first orientation and the second orientation; and
            utilize the two-dimensional silhouette to search the image captured by the image sensor for allocating coordinates of the trackable device within the image.

2. The tracking system of claim 1, wherein the processing circuit is further operable to track a spatial relationship between the trackable device and the tracking device according to the coordinates of the trackable device within the image.

3. The tracking system of claim 1, wherein the tracking device comprises a storage unit, the storage unit is configured to store a three-dimensional model of the trackable device, and the processing circuit is operate to calculate the two-dimensional silhouette by:
    determining a reference plane corresponding to the second orientation;
    aligning the three-dimensional model with the first orientation; and
    projecting a contour the three-dimensional model onto the reference plane to obtain the two-dimensional silhouette.

4. The tracking system of claim 1, wherein the tracking device comprises a storage unit, the storage unit is configured to store a lookup table, the lookup table records a plurality of candidate two-dimensional silhouettes, the candidate two-dimensional silhouettes correspond a plurality of first orientation ranges of the trackable device and a plurality of second orientation ranges of the tracking device, and the processing circuit is operate to calculate the two-dimensional silhouette by:
    selecting one of the candidate two-dimensional silhouettes from the lookup table as the two-dimensional silhouette by comparing the first orientation sensed by the tracking device and the second orientation sensed by the tracking device with the first orientation ranges and the second orientation ranges.

5. The tracking system of claim 4, wherein the lookup table is established by capturing reference images of the trackable device in views of the image sensor under different combinations of the first orientation ranges and the second orientation ranges, and recording contours of the trackable device in the reference images into the lookup table.

6. The tracking system of claim 1, wherein the tracking device comprises a storage unit, the storage unit is configured to store K lookup tables, each of the K lookup tables records a plurality of candidate two-dimensional silhouettes, the candidate two-dimensional silhouettes correspond a plurality of first orientation ranges of the trackable device and a plurality of second orientation ranges of the tracking device, and the processing circuit is operate to calculate K two-dimensional silhouettes in reference with the K lookup tables corresponding to the three-dimensional shape of the trackable device according to the first orientation and the second orientation, K is a positive integer larger than 1.

7. The tracking system of claim 6, wherein the processing circuit is further operable to:
    divide the image captured by the image sensor into K divided regions; and
    utilize one of the K two-dimensional silhouettes to search within a corresponding one of the K divided regions for allocating coordinates of the trackable device within the image.

8. The tracking system of claim 1, wherein the first orientation sensor or the second orientation sensor comprises an Inertial Measurement Unit (IMU), an accelerometer or a gyro sensor.

9. The tracking system of claim 1, wherein the trackable device comprises a first communication circuit configured to transmit the first orientation of the trackable device to the tracking device, the tracking device comprises a second communication circuit communicatively connected with the first communication circuit, the second communication circuit is configured to receive the first orientation.

10. The tracking system of claim 9, wherein the first communication circuit or the second communication circuit comprises a radio frequency transceiver circuit, a local-area communication circuit or a telecommunication circuit.

11. A tracking method, suitable between a tracking device and a trackable device having a three-dimensional shape, the tracking method comprising:
    sensing a first orientation of the trackable device by a first orientation sensor of the trackable device;

transmitting the first orientation from the trackable device to the tracking device;
sensing a second orientation of the tracking device by a second orientation sensor of the tracking device;
calculating a two-dimensional silhouette corresponding to the three-dimensional shape of the trackable device according to the first orientation of the trackable device and the second orientation of the trackable device;
capturing an image by an image sensor of the tracking device; and
utilizing the two-dimensional silhouette to search the image captured by the image sensor for allocating coordinates of the trackable device within the image.

12. The tracking method of claim 11, further comprising:
tracking a spatial relationship between the trackable device and the tracking device according to the coordinates of the trackable device within the image.

13. The tracking method of claim 11, wherein the tracking device stores a three-dimensional model of the trackable device, and the operation of calculating the two-dimensional silhouette comprises:
determining a reference plane corresponding to the second orientation;
aligning the three-dimensional model with the first orientation; and
projecting a contour the three-dimensional model onto the reference plane to obtain the two-dimensional silhouette.

14. The tracking method of claim 11, wherein the tracking device stores a lookup table, the lookup table records a plurality of candidate two-dimensional silhouettes, the candidate two-dimensional silhouettes correspond a plurality of first orientation ranges of the trackable device and a plurality of second orientation ranges of the tracking device, and the operation of calculating the two-dimensional silhouette comprises:
selecting one of the candidate two-dimensional silhouettes from the lookup table as the two-dimensional silhouette by comparing the first orientation sensed by the tracking object and the second orientation sensed by the tracking device with the first orientation ranges and the second orientation ranges.

15. The tracking method of claim 14, wherein the lookup table is established by capturing reference images of the trackable device in views of the image sensor under different combinations of the first orientation ranges and the second orientation ranges, and recording contours of the trackable device in the reference images into the lookup table.

16. The tracking method of claim 11, wherein the tracking device stores K lookup tables, each of the K lookup table records a plurality of candidate two-dimensional silhouettes, the candidate two-dimensional silhouettes correspond a plurality of first orientation ranges of the trackable device and a plurality of second orientation ranges of the tracking device, and the operation of calculating the two-dimensional silhouette comprises:
calculating K two-dimensional silhouettes in reference with the K lookup tables corresponding to the three-dimensional shape of the trackable device according to the first orientation and the second orientation, K is a positive integer larger than 1.

17. The tracking method of claim 16, wherein the operation of utilizing the two-dimensional silhouette to search the image comprises:
dividing the image captured by the image sensor into K divided regions; and
utilizing one of the K two-dimensional silhouettes to search within a corresponding one of the K divided regions for allocating coordinates of the trackable device within one of the K divided regions.

* * * * *